(12) United States Patent
Suganuma et al.

(10) Patent No.: US 9,201,843 B2
(45) Date of Patent: Dec. 1, 2015

(54) CONTROL DEVICE

(75) Inventors: Hideaki Suganuma, Yokohama (JP); Ryotaro Fujiwara, Suginami-ku (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 137 days.

(21) Appl. No.: 13/807,606

(22) PCT Filed: Jun. 29, 2010

(86) PCT No.: PCT/JP2010/061057
§ 371 (c)(1),
(2), (4) Date: Dec. 28, 2012

(87) PCT Pub. No.: WO2012/001771
PCT Pub. Date: Jan. 5, 2012

(65) Prior Publication Data
US 2013/0103230 A1    Apr. 25, 2013

(51) Int. Cl.
*G05D 1/00* (2006.01)
*G05D 3/00* (2006.01)
(Continued)

(52) U.S. Cl.
CPC .............. *G06F 17/00* (2013.01); *G01C 21/00* (2013.01); *G06F 21/10* (2013.01)

(58) Field of Classification Search
CPC .......... G06F 21/31; G06F 3/06; G06F 11/07; G06F 17/22; G06F 13/10; G06F 17/5009; G06F 8/65; G06F 8/66; G06F 11/30; G06F 13/24; G06F 17/50; G06F 21/85; G06F 8/61; G06F 8/67; H04L 63/08; H04L 9/00; H04L 67/02; H04L 41/0253; G01C 21/3688; G01C 21/34; G01C 21/26; G01C 21/36; G01C 21/3492; G01C 21/3647; G01C 21/3664

USPC ............ 701/1, 2, 36, 70, 22, 103, 29.1, 31.5, 701/49, 102, 112; 726/28, 1, 3, 7, 5; 180/65.265, 6.44, 9.5, 249

See application file for complete search history.

(56) References Cited

U.S. PATENT DOCUMENTS 6,657,535 B1 *  12/2003  Magbie et al. ................ 340/5.31
6,882,729 B2 *  4/2005  Arling et al. .................. 380/274
(Continued)

FOREIGN PATENT DOCUMENTS

JP     2004-192278 A    7/2004
JP     2007-065856 A    3/2007
(Continued)

OTHER PUBLICATIONS

Keiichi Yamachika, "Windows Server Update Services (No. 12) (Soko ga Shiritai Windows Server Update Services (Dai 12 Kai))", online, Jan. 28, 2009, 12 pages, Partial English Translation.

*Primary Examiner* — Calvin Cheung
*Assistant Examiner* — Luis A Martinez Borrero
(74) *Attorney, Agent, or Firm* — Sughrue Mion, PLLC

(57) ABSTRACT

A program delivery center is a program update device which updates a program of an ECU mounted in a vehicle, wherein a right holder specification unit specifies a right holder who has a right to execute the update of the program on the basis of information regarding the vehicle, and a reprogramming guide execution unit sets and outputs program update guide notification to the right holder. Accordingly, the update of the program by a person other than the right holder can be avoided, thereby improving security. Furthermore, since the update of the program is notified to the right holder which can execute the update of the program, a program update execution frequency increases compared to a case where a user who cannot execute the update of the program is notified, thereby prompting the execution of the program update.

4 Claims, 10 Drawing Sheets

(51) Int. Cl.
 *G06F 7/00* (2006.01)
 *G06F 17/00* (2006.01)
 *G01C 21/00* (2006.01)
 *G06F 21/10* (2013.01)

(56) References Cited

U.S. PATENT DOCUMENTS

| | | | |
|---|---|---|---|
| 6,988,034 | B1 | 1/2006 | Marlatt et al. |
| 8,060,753 | B2 * | 11/2011 | King .............................. 713/186 |
| 8,725,330 | B2 * | 5/2014 | Failing ............................ 701/22 |
| 2004/0124968 | A1 * | 7/2004 | Inada et al. ................. 340/5.72 |
| 2004/0267410 | A1 | 12/2004 | Duri et al. |
| 2005/0139664 | A1 * | 6/2005 | Yamagiwa .................. 235/385 |
| 2006/0053235 | A1 * | 3/2006 | Terada et al. ................... 710/16 |
| 2006/0055509 | A1 * | 3/2006 | Teshima et al. ............. 340/5.53 |
| 2007/0118755 | A1 * | 5/2007 | Scholze ........................ 713/182 |
| 2007/0143013 | A1 | 6/2007 | Breen |
| 2008/0244757 | A1 * | 10/2008 | Nakagaki ........................ 726/28 |
| 2009/0265071 | A1 * | 10/2009 | Isaji et al. ....................... 701/70 |
| 2009/0284359 | A1 * | 11/2009 | Huang et al. ................ 340/426.1 |
| 2010/0087987 | A1 * | 4/2010 | Huang et al. ................... 701/36 |
| 2010/0148923 | A1 * | 6/2010 | Takizawa .................... 340/5.82 |
| 2010/0217630 | A1 * | 8/2010 | Ehrman et al. ..................... 705/5 |
| 2011/0109431 | A1 * | 5/2011 | Bragagnini et al. ......... 340/5.52 |
| 2011/0237186 | A1 * | 9/2011 | Preissinger et al. .......... 455/41.1 |
| 2013/0227650 | A1 * | 8/2013 | Miyake ............................. 726/3 |

FOREIGN PATENT DOCUMENTS

| | | |
|---|---|---|
| JP | 2008-239021 A | 10/2008 |
| WO | 2007/109541 A2 | 9/2007 |

* cited by examiner

CONTROL DEVICE

CROSS REFERENCE TO RELATED APPLICATIONS

This application is a National Stage of International Application No. PCT/JP2010/061057 filed Jun. 29, 2010, the contents of all of which are incorporated herein by reference in their entirety.

TECHNICAL FIELD

The present invention relates to a control device which changes a control content of control means mounted in a vehicle.

BACKGROUND ART

In the related art, a technique which updates a program for controlling a device mounted in a vehicle has been suggested. For example, in an in-vehicle gateway device described in Patent Literature 1, if a program is received from a server, a program already stored in the in-vehicle gateway device is updated to the received program.

CITATION LIST

Patent Literature

[Patent Literature 1] Japanese Unexamined Patent Application Publication No. 2004-192278

SUMMARY OF INVENTION

Technical Problem

In general, program update notification of an ECU (Electronic Control Unit) which is a vehicle control device (control means) is executed without specifying a notification party. For this reason, when the update of the program is notified to a person who rents a rental car or a vehicle, the person may not cope with the update of the program or may feel inconvenience. Accordingly, the update of the program may not be executed. When a person other than the owner of the vehicle receives program update notification, since the person may execute the update of the program without permission from the owner of the vehicle, it is not preferable from the viewpoint of security.

The invention has been accomplished in order to solve the above-described problems, and an object of the invention is to provide a control device capable of prompting change of a control content and improving security.

Solution to Problem

In order to solve the above-described problems, the invention provides a control device which changes a control content of control means mounted in a vehicle. The control device includes right holder specification means for specifying a right holder who has a right to execute the change of the control content on the basis of information regarding the vehicle, and change guide setting means for, when the right holder is specified by the right holder specification means, setting and outputting control content change guide notification to the right holder.

In this control device, the right holder who has a right to execute the change of the control content is specified on the basis of information regarding the vehicle, and the control content change guide notification is set and output to the right holder. Accordingly, the change of the control content by a person other than the right holder can be avoided, thereby improving security. Furthermore, since the change of the control content is notified to the right holder who can execute the change of the control content, a control content change execution frequency increases compared to a case where a user who cannot execute the change of the control content is notified, thereby prompting the execution of the change of the control content. As described above, in the control device, the change of the control content can be prompted, and security can be improved.

It is preferable that the control device further includes determination means for determining whether or not the vehicle is owned by an individual or a corporate (i.e., a corporation or legal entity) on the basis of the information regarding the vehicle, wherein the right holder specification means specifies the right holder in accordance with the determination result of the determination means. In this case, since it is determined whether or not the vehicle is owned by an individual or a legal entity, the right holder can be specified in conformity with the feature of the individual or the legal entity.

It is preferable that, when the right holder specification means specifies the right holder as a corporate, the change guide setting means is set to guide the change of the control content to an administrator who administrates the vehicle. In this case, the change of the control content can be prevented from being notified to a person who just belongs to a corporate or rents the vehicle from a corporate. As a result, the change of the control content can be further prompted, and security can be further improved.

It is preferable that information regarding to a vehicle chassis is at least one of vehicle chassis number information representing the vehicle chassis number of the vehicle, maintenance record information relating to the maintenance records of the vehicle, parking lot information regarding a contract content of a parking lot contracted by the user of the vehicle, automobile insurance information regarding to the content of an automobile insurance contacted by the user of the vehicle, and navigation configuration information relating to a content set by the user in a navigation system mounted in the vehicle. With the use of these kinds of information, the right holder can be satisfactorily specified. The right holder is the owner of the vehicle.

It is preferable that the control means is an electronic control device, the right holder specification means specifies the right holder who has a right to execute change of a program of the electronic control device on the basis of the information regarding the vehicle, and when the right holder is specified by the right holder specification means, the change guide setting means sets and outputs program change guide notification to the right holder. With this configuration, the change (update, addition, deletion) of the program of the electronic control device can be prompted, and security can be improved.

Advantageous Effects of Invention

According to the invention, the change of the control content can be prompted, and security can be improved.

DESCRIPTION OF EMBODIMENTS

Figure 1:
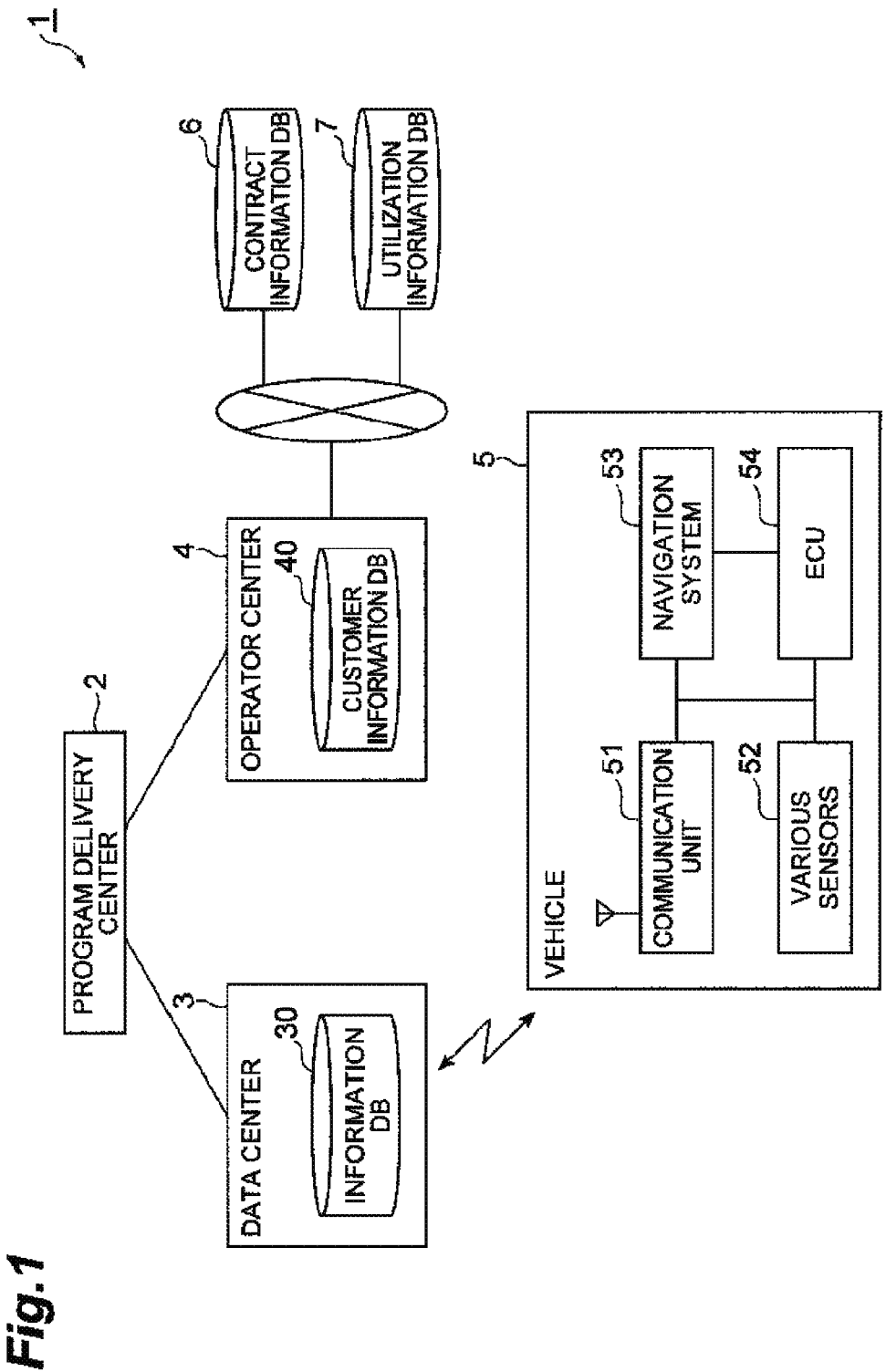
FIG. 1 is a configuration diagram of a program update system including a program delivery center which is a control device according to an embodiment of the invention.

Hereinafter, an embodiment of the invention will be described in detail with reference to the drawings. In the following description, the same components or components having the same functions are represented by the same reference numerals, and overlapping description will be omitted.

FIG. 1 is a configuration diagram of a program update system including a program delivery center which is a control device according to an embodiment of the invention. As shown in FIG. 1, a program update system 1 includes program delivery center 2, a data center 3, an operator center 4, and a vehicle 5. The program delivery center 2, the data center 3, and the operator center 4 are communicably connected together through a network.

The data center 3 is operated by, for example, an automobile manufacturer, and performs guide or instruction at the time of program update (hereinafter, referred to as reprogramming), addition, and deletion as change of a control content of an ECU (Electronic Control Unit) which is an electronic control device (control means) in the vehicle 5, such as an automobile. The data center 3 includes information DB (database) 30 which holds various kinds of data relating to the vehicle. The information DB 30 includes vehicle information DB which stores vehicle information relating to the vehicle 5, a maintenance record DB which stores information relating to a maintenance history of the vehicle 5, a driver learning DB which stores driver learning information, such as driving characteristics of a driver, and a navigation configuration information DB which stores navigation configuration information relating to the configuration (home setting and the like) of a navigation system mounted in the vehicle 5. The data center 3 administrates customer information specified from the driver learning information and the navigation configuration information.

The data center 3 transfers data output from the program delivery center 2 or the operator center 4 to the vehicle 5, and transfers data transmitted from the vehicle 5 to the program delivery center 2 or the operator center 4.

The operator center 4 is a center in which an operator is stationed and supports the administration or monitoring of reprogramming executed in each vehicle 5 by the operator. The operator center 4 has a data communication function, and transmits and receives data to and from the data center 3. Accordingly, data communication between the operator center 4 and the vehicle 5 is performed through the data center 3.

If reprogramming data (estimated time of start of reprogramming, processing time, vehicle stop position, and the like) transmitted from the program delivery center 2 is received, the operator center 4 determines whether or not an operator can be secured while reprogramming is performed on the basis of reprogramming data, and transmits operator securing information to the program delivery center 2. When the operator is secured, the operator stands by before the estimated time of start. At this time, the operator center 4 is connected to the reserved vehicle 5, and notifies the driver that the operator executes reprogramming on the basis of monitoring of the operator near a destination. If an ECU 54 from the reserved vehicle 5 is automatically connected to the operator center 4, in the operator center 4, the operator who stands by responds.

The operator center 4 includes a customer information DB 40. The customer information DB 40 stores customer information linked with the vehicle information of the vehicle information DB of the data center 3. The operator center 4 is connected to the contract information DB 6 and the utilization information DB 7 through a network NW. The contract information DB 6 and the utilization information DB 7 are, for example, database servers which are shared on the network.

The contract information DB 6 is a database which stores information relating to the subscription (contract) to an automobile insurance subscribed by the user of the vehicle 5, information relating to the contract to a parking lot of the user, or the like. The contract information DB 6 collaborates with a database of an insurance company or an administration company which administrates the parking lot, and acquires and stores contract information of the user of the vehicle 5.

The utilization information DB 7 is a database (vehicle administration system) which stores the schedule of a company which has company-owned cars or commercial cars, a car-rental company, or the like. The utilization information DB 7 stores the schedule which is input to a scheduler by a personal computer of a corporate user, a mobile phone or a PDA (Personal Digital Assistant) of an owner who owns a vehicle, or the like.

Figure 2:
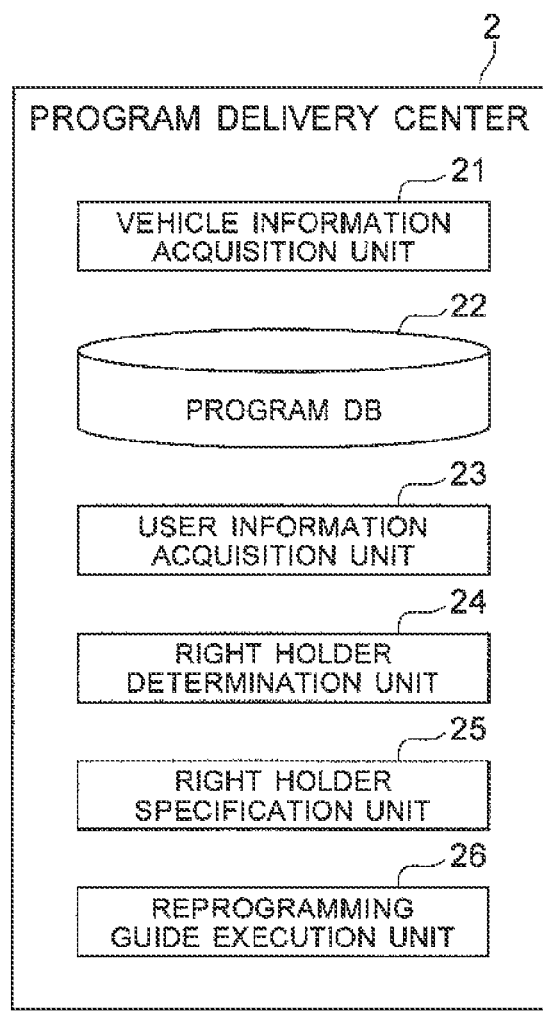
FIG. 2 is a diagram showing the configuration of the program delivery center.

The program delivery center 2 is a program update device (control device) which updates and administrates a program of the ECU 54 by remote control. As shown in FIG. 2, the program delivery center 2 includes a vehicle information acquisition unit 21, a program administration DB 22, a user information acquisition unit 23, a right holder determination unit (determination means) 24, a right holder specification unit (right holder specification unit) 25, and a reprogramming guide execution unit (change guide setting means) 26. The program delivery center 2 has a data communication function, and transmits and receives data to and from the data center 3. Accordingly, data communication between the program delivery center 2 and the vehicle 5 is performed through the data center 3. The program update device as the program delivery center 2 is a server device which includes a CPU (Central Processing Unit), a ROM (Read Only Memory), a RAM (Random Access Memory), a communication module, and the like.

The vehicle information acquisition unit 21 is a portion which acquires various kinds of information regarding the vehicle 5. If a company which supports each vehicle 5 newly stores a program for update in the program administration DB 22 which administrates the program of the electronic control device, the vehicle information acquisition unit 21 acquires information regarding the vehicle in which the update of the program is required. Specifically, the vehicle information acquisition unit 21 transmits a vehicle information acquisition request for requesting acquisition of information relating to a vehicle model and a model year and a vehicle chassis number information acquisition request for requesting acquisition of information relating to the vehicle chassis number of the vehicle 5 to the vehicle 5, and acquires the vehicle information and the vehicle chassis number information from the vehicle 5. The vehicle information acquisition unit 21 transmits a navigation configuration information request for requesting acquisition of navigation configuration information of a navigation system 53 mounted in the vehicle 5, a navigation information acquisition request for requesting acquisition of navigation information, and a biometric authentication information request for requesting biometric authentication information to the vehicle 5, and acquires the navigation configuration information, the navigation information, and the biometric authentication information from the vehicle 5. The vehicle information acquisition unit 21 outputs various kinds of acquired information to the user information acquisition unit 23, the right holder determination unit 24, and the right holder specification unit 25.

The user information acquisition unit 23 is a portion which acquires information of the user who owns the vehicle 5 in which the update of the program is required. If the vehicle chassis number information output from the vehicle information acquisition unit 21 is received, the user information acquisition unit 23 transmits a customer information acquisition request for requesting acquisition of customer information linked with the vehicle chassis number information to the operator center 4, and acquires the customer information from the operator center 4. The user information acquisition unit 23 acquires maintenance requester information representing a maintenance requester from maintenance record information (stored in a maintenance information DB of the data center 3) owned by a dealer or a maintenance shop, or other kinds of information capable of specifying the owner on the basis of the vehicle chassis number information. If the maintenance requester information is acquired, the user information acquisition unit 23 transmits a contract information acquisition request (an automobile insurance information acquisition request and a parking lot information acquisition request) for requesting acquisition of contract information (automobile insurance subscriber information and parking lot information) linked with the maintenance requester information to the contract information DB 6, and acquires the contract information from the contract information DB 6.

The user information acquisition unit 23 transmits a utilization information acquisition request for requesting acquisition of utilization information (the status of utilization or reservation of a rental car or the like) of the vehicle 5 to the utilization information DB 7, and acquires the utilization information from the utilization information DB 7. The user information acquisition unit 23 transmits a driving characteristic information acquisition request for requesting acquisition of driving characteristic information of the user of the vehicle 5 to the data center 3, and acquires the driving characteristic information from the data center. The user information acquisition unit 23 transmits a learning information acquisition request for requesting acquisition of learning information relating to the history of the driving characteristic information to the data center 3, and acquires the learning information from the data center 3. The user information acquisition unit 23 outputs various kinds of acquired information to the right holder determination unit 24 and the right holder specification unit 25.

The right holder determination unit 24 is a portion which determines whether the vehicle 5 is owned by an individual or a corporate. The right holder determination unit 24 determines whether or not the vehicle 5 is a vehicle subject for reprogramming or whether the user of the vehicle 5 is an individual or a corporate on the basis of various kinds of information (information regarding the vehicle) acquired by the vehicle information acquisition unit 21 and the user information acquisition unit 23. The right holder determination unit 24 outputs determination result information representing the determination result to the right holder specification unit 25. Specific processing of the right holder determination unit 24 will be described below with reference to the flowcharts of FIGS. 3 to 6.

The right holder specification unit 25 is a portion which specifies a right holder who has a right of reprogramming in the vehicle 5, that is, the owner of the vehicle 5. If the determination result information output from the right holder determination unit 24 is received, the right holder specification unit 25 executes processing for specifying a user who has a right to update reprogramming on the basis of the determination result information, and specifies the right holder. The right holder specification unit 25 specifies the right holder as an individual or a corporate on the basis of the biometric authentication information, the navigation information, the navigation configuration information, the driving characteristic information, and the learning information (information regarding the vehicle). The right holder specification unit 25 outputs right holder information relating to the right holder to the reprogramming guide execution unit 26. Specific processing of the right holder specification unit 25 will be described below with reference to the flowcharts of FIGS. 3 to 6.

The reprogramming guide execution unit 26 is a portion which executes reprogramming guide. If the right holder information output from the right holder specification unit 25 is received, the reprogramming guide execution unit 26 sets reprogramming guide notification in accordance with the right holder information, and executes reprogramming guide. Specifically, when the owner of the vehicle 5 is an individual and the right holder is specified, the reprogramming guide execution unit 26 executes reprogramming guide. When the owner of the vehicle 5 is a corporate and the right holder is specified, since a case where the right holder does not drive the vehicle thoroughly is considered, the reprogramming guide execution unit 26 notifies the driver of the effect of making contact to an administrator and an administration department. The reprogramming guide execution unit 26 transmits set reprogramming data relating to reprogramming guide to the operator center 4 through the data center 3. The reprogramming guide execution unit 26 may acquire the schedule of the right holder from the scheduler at the time of reprogramming guide to the right holder who is an individual, and may set the time at which reprogramming update guide is executed on the basis of the schedule.

The reprogramming guide execution unit 26 sets a method for reprogramming guide to the user on the basis of specification information of the user. Specifically, the reprogramming guide execution unit 26 acquires characteristic information of the user of the vehicle 5 from the data center 3, and sets the method for reprogramming method to the user on the basis of the characteristic information (sex, age, the status of utilization of the navigation system, reprogramming execution frequency, or the like). As the method for reprogramming update guide, there is a method in which only reprogramming notification is made (the user performs update along a guide), and the operator of the operator center 4 directly guides an update sequence to the user.

The vehicle 5 includes a communication unit 51, various sensors 52, a navigation system 53, and an ECU 54. The communication unit 51 is a portion which performs data transmission and reception with the data center 3. The communication unit 51 receives data transmitted from the data center 3 and outputs data to the ECU 54, and also transmits data output from the ECU 54 to the data center 3.

The sensors 52 are portions which acquire biometric authentication information, information regarding to a seating position or the like, and information relating to the driving state (accelerator operation, brake operation, wheel steering, or the like) of the driver. The sensors 52 acquire information relating to, for example, fingerprint, retina, iris, vein, voice, DNA, and the like as biometric authentication information. The sensors 52 output the acquired information to the ECU 54.

The navigation system 53 measures the absolute position of the vehicle 5 on the ground by a GPS (Global Positioning System), compares the absolute position with map information stored separately, specifies the position of the vehicle on the map, and displays the specified position on a display. In the navigation system 53, an input from the user is received, and an operation according to the input and acquisition of information according to the operation are performed. The navigation system 53 is configured to perform data communication with the operator center 4 through the communication unit 51. A voice call with the operator center 4 can be performed.

The ECU 54 is a portion which controls processing relating to reprogramming. In the ECU 54, administration of an ECU (not shown) subject to reprogramming, reprogramming request reception, determination on whether or not reprogramming can be executed (determination on whether or not the vehicle is stopped, or the like), notification of a reprogramming operation sequence, processing for learning and transmitting the driving characteristic of the driver on the basis of information acquired by the sensors 52, and the like are performed. The driving characteristic is information relating to an accelerator operation, a brake operation, or the like. In the case of an accelerator operation, the driving characteristic is data relating to an accelerator operation (an accelerator operation at the time of starting from the stopped state and an accelerator opening timing during traveling) when a given time has elapsed after traveling starts. In the case of a brake operation, the driving characteristic is data relating to a brake operation (at the time of stop, reduction in speed, curve (the map information of the navigation system 53 is linked)) when a given time has elapsed after traveling starts. The driving characteristic is data in which an accelerator operation and a brake operation are combined, and data of a vehicle speed, an accelerator opening, and brake ON when a given time has elapsed after traveling starts. In the ECU 54, the driving characteristic is learned for each travel, linked with a traveling start point and a traveling end point, and sequentially transmitted to the data center 3.

Subsequently, the operation of the program delivery center 2 will be described. FIGS. 3 to 6 are flowcharts showing the operation of the program delivery center. In the program delivery center 2, processing is performed with the flow of determination on whether or not a vehicle is subjected to reprogramming guide, vehicle specification, owner specification, guide subject specification, and reprogramming guide execution.

(Vehicle Specification and Owner Specification Processing)

Figure 3:
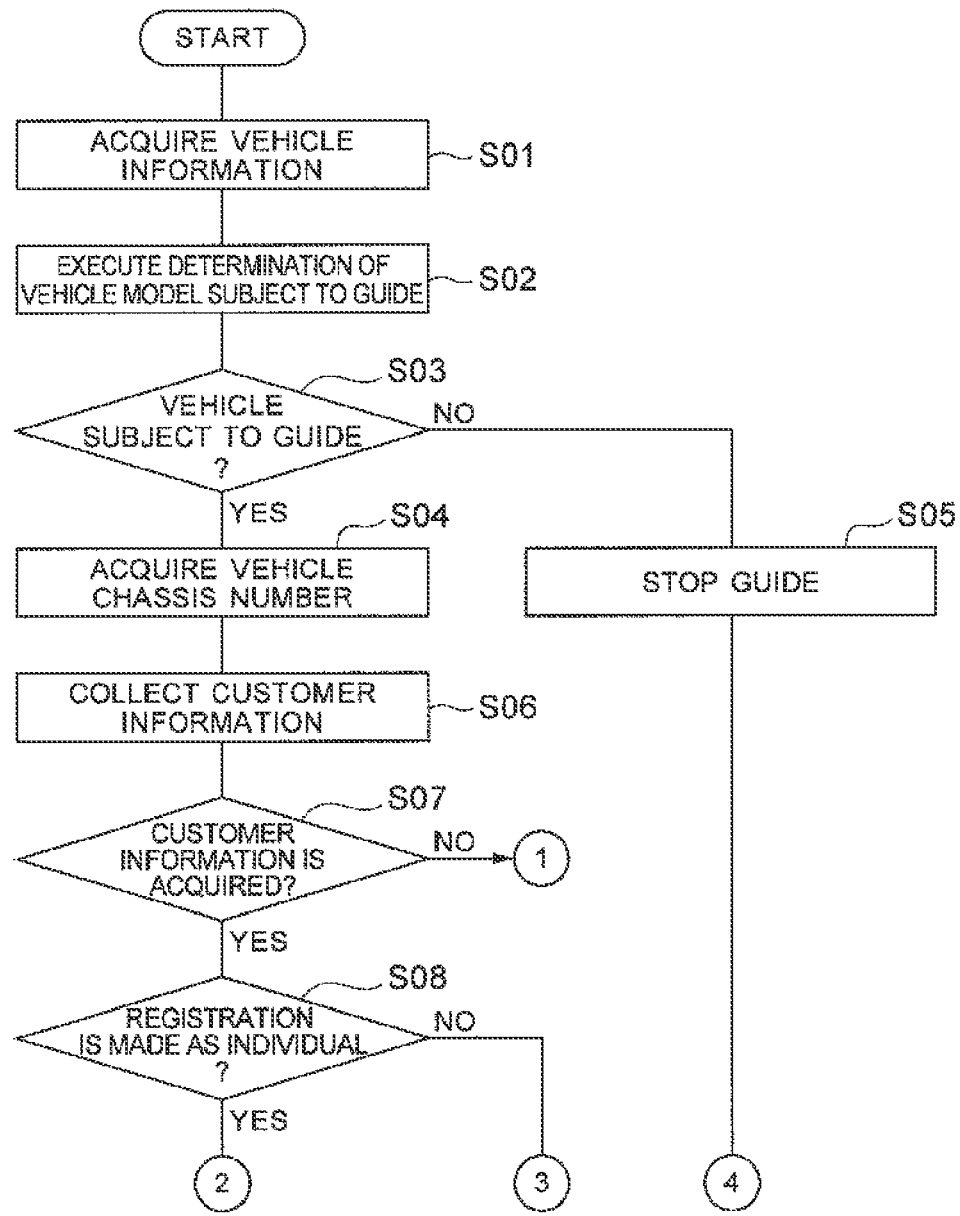
FIG. 3 is a flowchart showing the operation of the program delivery center.

As shown in FIG. 3, first, vehicle information (vehicle model and model year) is acquired from the vehicle 5 by the vehicle information acquisition unit 21 (Step S01). If the vehicle information is acquired, determination on a vehicle model subject to reprogramming guide is executed on the basis of the vehicle information by the right holder determination unit 24 (Step S02), and it is determined whether or not the vehicle model is a vehicle model subject to guide (Step S03). When it is determined that the vehicle model is a vehicle model subject to guide, the process progresses to Step S04. When it is determined that the vehicle model is not a vehicle model subject to guide, reprogramming guide is aborted (Step S05), and the processing ends.

In Step S04, vehicle chassis number information relating to the vehicle chassis number of the vehicle 5 is acquired by the information acquisition unit 21. Next, processing for collecting customer information from the customer information DB 40 of the operator center 4 on the basis of information for specifying the vehicle 5, such as the vehicle chassis number is executed by the user information acquisition unit 23 (Step S06). It is determined whether or not the customer information is acquired from the customer information DB 40 (Step S07). When it is determined that the customer information is acquired from the customer information DB 40, the process progresses to Step S08. When it is determined that the customer information is not acquired from the customer information DB 40, the process progresses to Step S10 shown in FIG. 4.

In Step S08, it is determined whether or not registration in the customer information is made as an individual. When it is determined that registration is made as an individual, the process progresses to Step S20 shown in FIG. 5. When it is determined that registration is not made as an individual, the process progresses Step S40 shown in FIG. 6.

(Owner Specification Processing)

Figure 4:
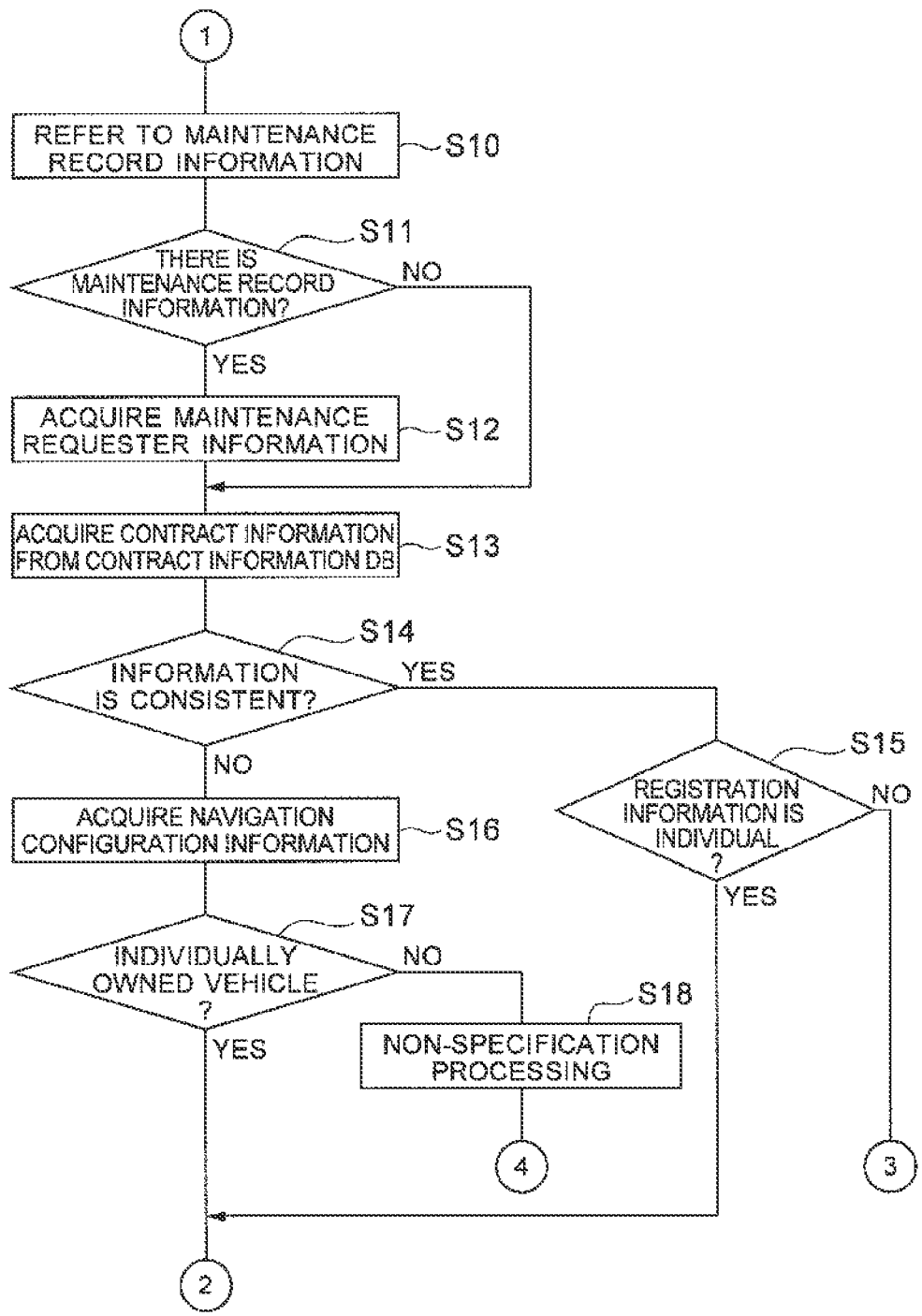
FIG. 4 is a flowchart showing the operation of the program delivery center.

Subsequently, as shown in FIG. 4, maintenance record information stored in the maintenance information DB of the information DB 30 of the data center 3 is referred to by the user information acquisition unit 23 (Step S10). It is determined by the right holder determination unit 24 whether or not there is maintenance record information linked with the customer information on the basis of the customer information (Step S11). When it is determined that there is maintenance record information, maintenance requester information linked with the maintenance record information is acquired (Step S12). When it is determined that there is no maintenance record information, the process progresses to Step S13.

In Step S13, utilization information is acquired from the contract information DB 6 by the user information acquisition unit 23. Specifically, automobile insurance subscriber information or parking lot information (contract information) is acquired from the contract information DB 6. It is determined by the right holder determination unit 24 whether or not various kinds of acquired information are consistent (Step S14). When it is determined that various kinds of acquired information are consistent, the process progresses to Step S15. When it is determined that the acquired information is not consistent, the process progresses to Step S16.

In Step S15, it is determined by the right holder determination unit 24 whether or not registration information is an individual. When it is determined that the registration information is an individual, the process progresses to Step S20 shown in FIG. 5. When it is determined that the registration information is not an individual, the process progresses to Step S40 shown in FIG. 6.

In Step S16, navigation configuration information (home setting and destination setting) of the navigation system 53 is acquired from the vehicle 5. An owner is estimated from the acquired navigation configuration information, and it is determined by the right holder determination unit 24 whether or not the vehicle is an individually owned vehicle (Step S17). When it is determined that the vehicle is an individually owned vehicle, the process progresses to Step S20 shown in FIG. 5. When it is determined that the vehicle is not an individually owned vehicle, non-specification processing is executed (Step S18), and the processing end.

(Right Holder Specification Processing as Individual)

Figure 5:
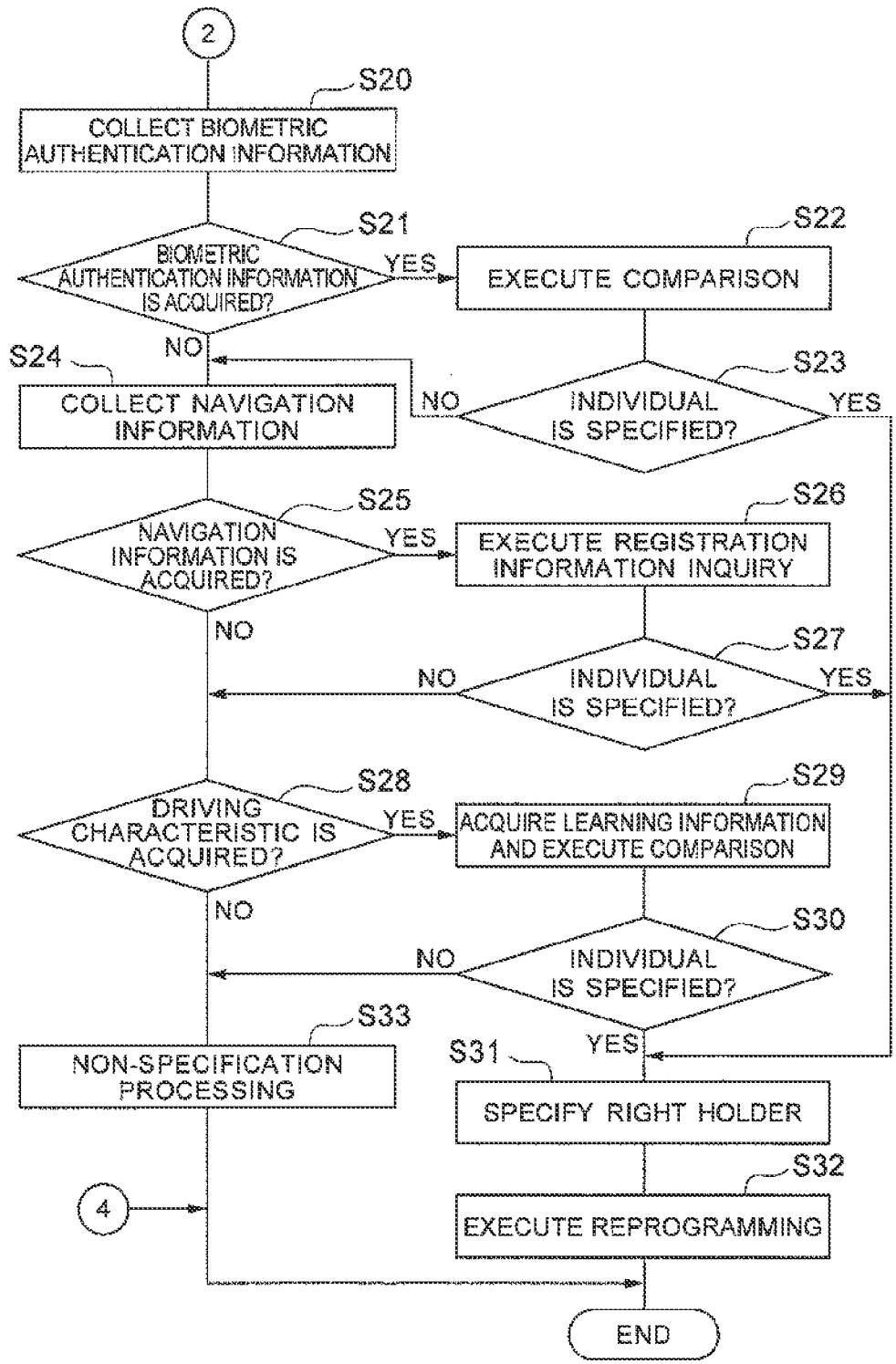
FIG. 5 is a flowchart showing the operation of the program delivery center.

Next, as shown in FIG. 5, when it is determined that the owner of the vehicle 5 is an individual, biometric authentication information is collected by the user information acquisition unit 23 (Step S20). The biometric authentication information is acquired by various sensors 52 of the vehicle 5, and is information relating to fingerprint, retina, iris, vein, voice, DNA, and the like. It is determined by the right holder specification unit 25 whether or not the biometric authentication information is acquired (Step S21). When it is determined that the biometric authentication information is acquired, the process progresses to Step S22. When it is determined that the biometric authentication information is not acquired, the process progresses to Step S24.

In Step S22, the right holder specification unit 25 compares the acquired biometric authentication information with registered information. As the result of comparison, it is determined by the right holder specification unit 25 whether or not an individual is specified (Step S23). When it is determined that an individual is specified, the process progresses to Step S31. When it is determined that an individual is not specified, the process progresses to Step S24.

In Step S24, navigation information of the navigation system 53 is collected. The navigation information is information relating to Bluetooth phone registration information registered for connection to the mobile phone of the user through Bluetooth and connection information to the mobile phone of the user. It is determined by the right holder specification unit 25 whether or not the navigation information is acquired (Step S25). When it is determined that the navigation information is acquired, the process progresses to Step S26. When it is determined that the navigation information is not acquired, the process progresses to Step S28.

In Step S26, the Bluetooth phone registration information is inquired by the right holder specification unit 25. Specifically, a database in which user information of the mobile phone is registered is inquired on the basis of the Bluetooth phone registration information. As the result of inquiry, it is determined by the right holder specification unit 25 whether or not an individual is specified (Step S27). When it is determined that an individual is specified, the process progresses to Step S31. When it is determined that an individual is not specified, the process progresses to Step S28.

In Step S28, it is determined by the right holder specification unit 25 whether or not driving characteristic information is acquired. The driving characteristic information is information relating to the accelerator, brake, or wheel operation, the seating position, or the like of the user. When it is determined that the driving characteristic information is acquired, the process progresses to Step S29. When it is determined that the driving characteristic information is not acquired, non-specification processing is executed (Step S33), and the processing ends.

In Step S29, learning information is acquired from the data center 3, and comparison is performed by the right holder specification unit 25. Specifically, information relating to the history of the driving characteristic stored in the learning information DB of the information DB 30 of the data center 3 is compared with the acquired driving characteristic information. As the result of comparison, when it is determined that an individual is specified, the right holder of the vehicle 5 is specified (Step S31), and reprogramming guide is executed by the reprogramming guide execution unit 26 (Step S32).

When it is determined that an individual is not specified, the process progresses to Step S33, and the processing ends.

(Right Holder Specification Processing as Corporate)

Figure 6:
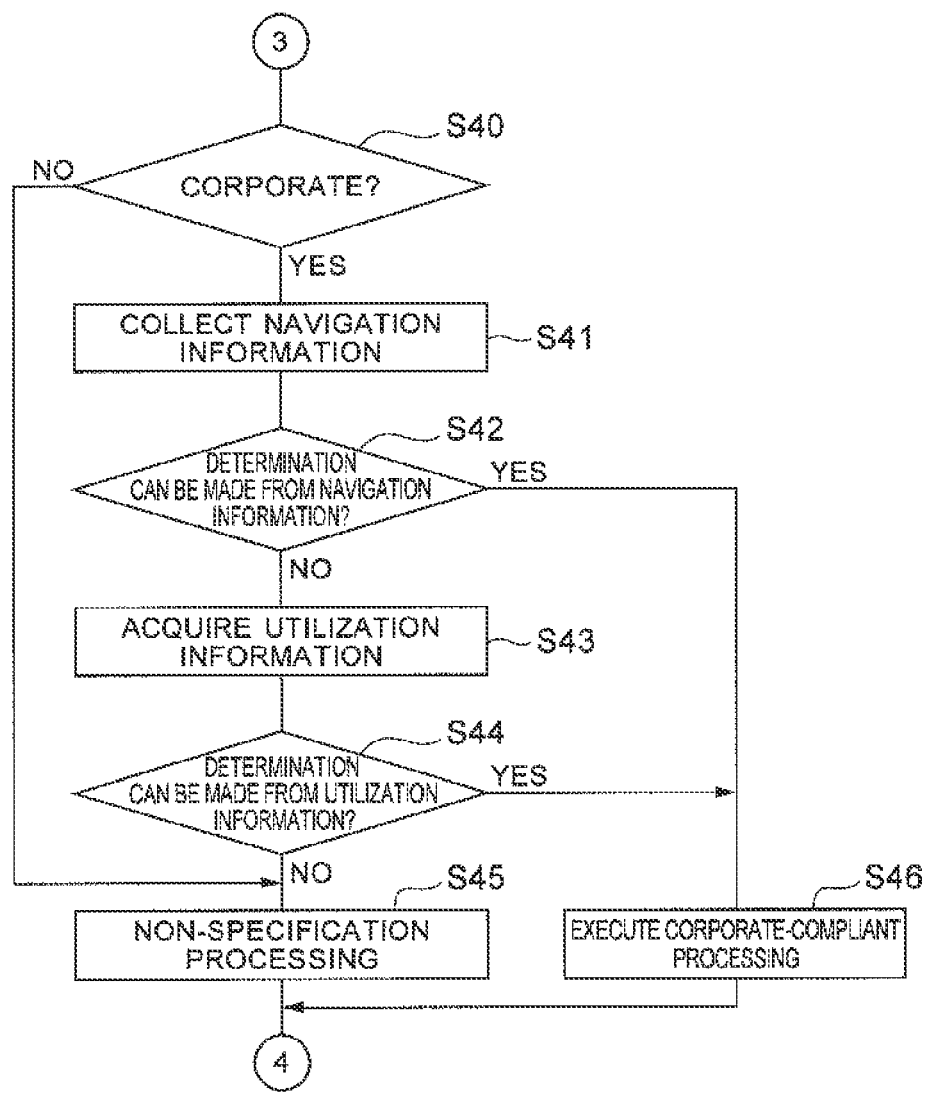
FIG. 6 is a flowchart showing the operation of the program delivery center.

As shown in FIG. 6, in Step S40, it is determined by the right holder determination unit 24 whether or not the registration information represents a corporate. When it is determined that the registration information represents a corporate, the process progresses to Step S41. When it is determined that the registration information does not represent a corporate, the process progresses to Step S45.

In Step S41, the navigation information of the navigation system 53 is collected by the vehicle information acquisition unit 21. The navigation information is information representing the current location of the vehicle 5 and information representing the destination. Accordingly, when the vehicle 5 is a rental car, whether or not the vehicle 5 is returned to the right holder can be determined. It is determined by the right holder determination unit 24 whether or not the right holder can be determined from the navigation information (Step S42). When it is determined that the right holder can be determined from the navigation information, corporate-compliant processing is executed (Step S46), and the processing ends. In the corporate-compliant processing, the effect of making contact relating to reprogramming guide to the administrator or the administration department of the vehicle 5 is notified to the driver, and execution of making contact using a letter or a mail is set. When it is determined that the right holder cannot be determined from the navigation information, the process progresses to Step S43.

When it is determined that the right holder cannot be determined from the navigation information, the utilization information of the utilization information DB 7 is collected by the user information acquisition unit 23 (Step S43). It is determined by the right holder determination unit 24 whether or not the right holder can be determined from the utilization information (Step S44). When it is determined that the right holder can be determined from the utilization information, corporate-compliant processing is executed (Step S46), and the processing ends. When it is determined that the right holder cannot be determined from the navigation information, non-specification processing is executed (Step S45), and the processing ends.

Figure 7:
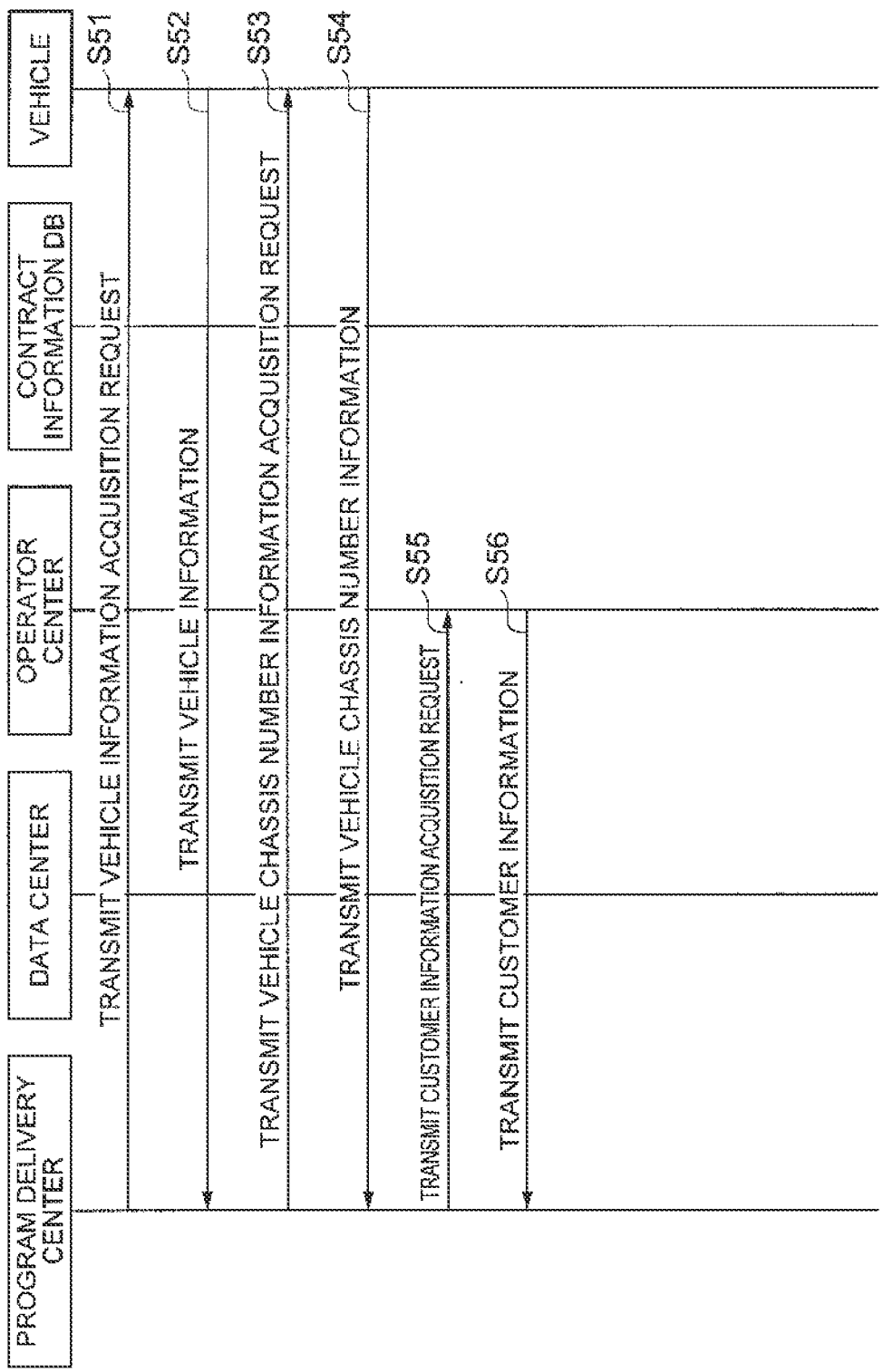
FIG. 7 is a sequence diagram showing vehicle and owner specification processing.

Subsequently, the operation of the program update system 1 will be described. Initially, the flow of data during processing for specifying the vehicle 5 and the owner of the vehicle 5 will be described. FIG. 7 is a sequence diagram showing vehicle and owner specification processing.

As shown in FIG. 7, first, a vehicle information acquisition request for requesting acquisition of vehicle information relating to a vehicle model and a model year from the program delivery center 2 is transmitted to the vehicle 5 (Step S51). In the vehicle 5 which receives the vehicle information acquisition request transmitted from the program delivery center 2, the vehicle information is acquired and transmitted to the program delivery center 2 (Step S52). Vehicle chassis number information acquisition information for requesting vehicle chassis number information relating to the vehicle chassis number of the vehicle 5 from the program delivery center 2 is transmitted to the vehicle 5 (Step S53). In the vehicle 5 which receives the vehicle chassis number information acquisition request transmitted from the program delivery center 2, the vehicle chassis number information is acquired and transmitted to the program delivery center 2 (Step S54).

Next, a customer information acquisition request for requesting acquisition of customer information linked with the vehicle chassis number information from the program delivery center 2 is transmitted to the operator center 4 (Step S55). In the operator center 4 which receives the customer information acquisition request transmitted from the program delivery center 2, the customer information linked with the vehicle chassis number information is acquired from the customer information DB, and the customer information is transmitted to the program delivery center 2 (Step S56). In the program delivery center 2 which receives the customer information, the owner of the vehicle 5 is specified.

Figure 8:
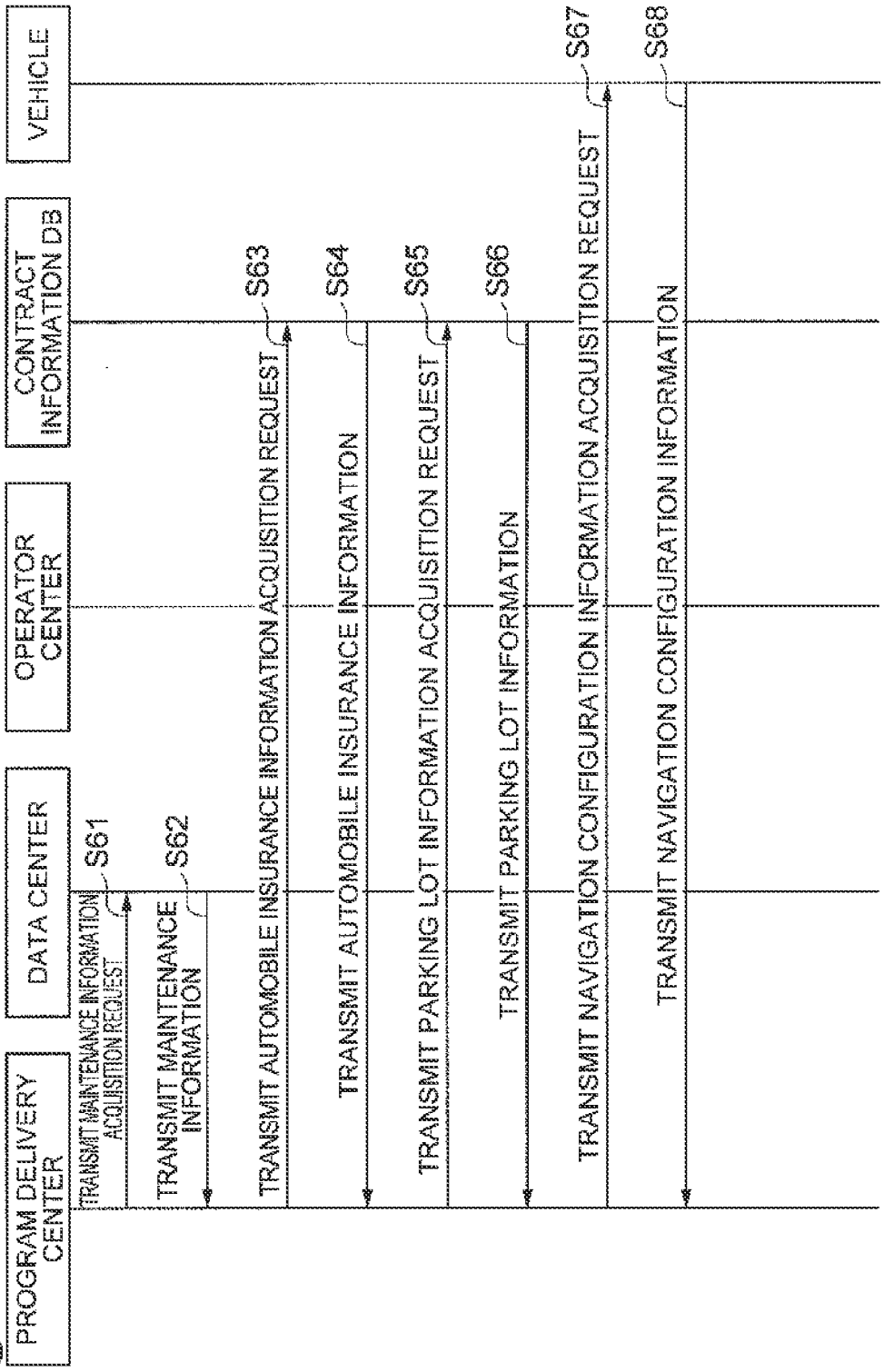
FIG. 8 is a sequence diagram showing vehicle owner specification processing when customer information has not been acquired.

Subsequently, the flow of data during processing for specifying the owner of the vehicle 5 when the customer information is not acquired during the above-described processing will be described. FIG. 8 is a sequence diagram showing vehicle owner specification processing when customer information is not acquired.

As shown in FIG. 8, first, a maintenance record information acquisition request for requesting acquisition of maintenance record information relating to the maintenance records of the vehicle 5 from the program delivery center 2 is transmitted to the data center 3 (Step S61). In the data center 3 which receives the maintenance record acquisition request transmitted from the program delivery center 2, maintenance information of the vehicle 5 is acquired from the maintenance record information DB, and the maintenance information is transmitted to the program delivery center 2 (Step S62).

An automobile insurance information acquisition request for requesting acquisition of automobile insurance information relating to an insurance subscribed by the vehicle 5 from the program delivery center 2 is transmitted to the contract information DB 6 (Step S63). In the contract information DB 6 which receives the automobile insurance information acquisition request transmitted from the program delivery center 2, the automobile insurance information of the vehicle 5 is acquired, and the automobile insurance information is transmitted to the program delivery center 2 (Step S64). A parking lot information acquisition request for requesting acquisition of parking lot information relating to the parking lot of the vehicle 5 from the program delivery center 2 is transmitted to the contract information DB 6 (Step S65). In the contract information DB 6 which receives the parking lot information acquisition request transmitted from the program delivery center 2, the parking lot information of the vehicle 5 is acquired, and the parking lot information is transmitted to the program delivery center 2 (Step S66).

A navigation configuration information acquisition request for requesting acquisition of navigation configuration information of the navigation system 53 from the program delivery center 2 is transmitted to the vehicle 5 (Step S67). In the vehicle 5 which receives the navigation configuration information acquisition request transmitted from the program delivery center 2, the navigation configuration information is acquired, and the navigation configuration information is transmitted to the program delivery center 2 (Step S68). In the program delivery center 2, the owner of the vehicle 5 is specified on the basis of various kinds of received information described above.

Figure 9:
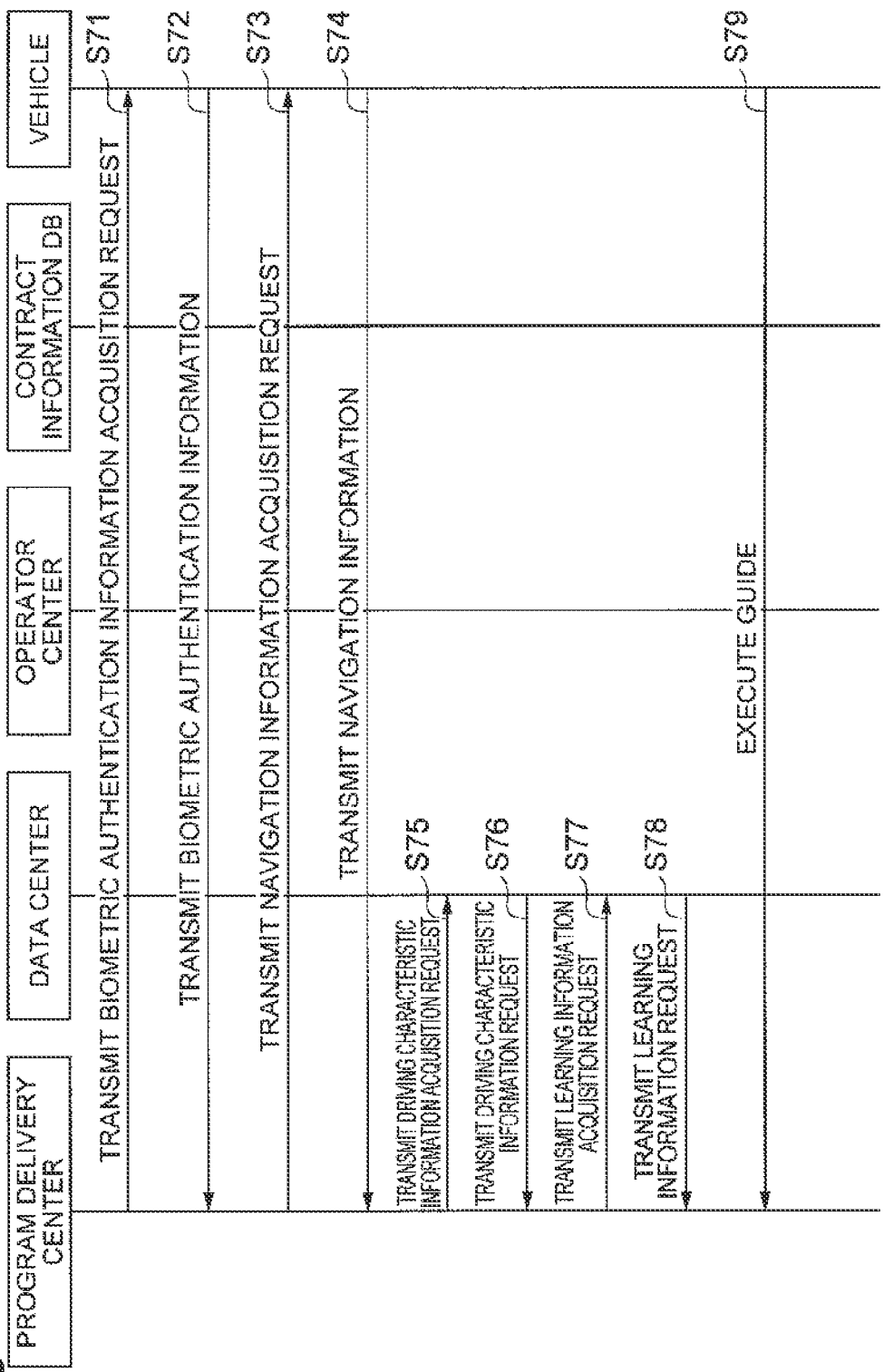
FIG. 9 is a sequence diagram showing right holder specification processing in an individual vehicle.

Subsequently, the flow of data during right holder specification processing when the owner of the vehicle 5 is an individual will be described. FIG. 9 is a sequence diagram showing right holder specification processing in an individual vehicle.

As shown in FIG. 9, first, a biometric authentication information acquisition request for requesting acquisition of biometric authentication information from the program delivery center 2 is transmitted to the vehicle 5 (Step S71). In the vehicle 5 which receives the biometric authentication acquisition request transmitted from the program delivery center 2, the biometric authentication information is acquired by the sensors 52, and the biometric authentication information is transmitted to the program delivery center 2 (Step S72). Next, a navigation information acquisition request for requesting acquisition of navigation information from the program delivery center 2 is transmitted to the vehicle 5 (Step S73). In the vehicle which receives the navigation information acquisition request transmitted from the program delivery center 2, the navigation information of the navigation system 53 is acquired, and the navigation information is transmitted to the program delivery center 2 (Step S74).

Subsequently, a driving characteristic information acquisition request for requesting acquisition of driving characteristic information from the program delivery center 2 is transmitted to the data center 3 (Step S75). In the data center 3 which receives the driving characteristic information request from the program delivery center 2, the driving characteristic information of the vehicle 5 is acquired, and the driving characteristic information is transmitted to the program delivery center 2 (Step S76). A learning information acquisition request for requesting acquisition of learning information from the program delivery center 2 is transmitted to the data center 3 (Step S77). In the data center 3 which receives the learning information acquisition request transmitted from the program delivery center 2, the learning information (the history of characteristic information) of the vehicle 5 is acquired from the learning information DB, and the learning information is transmitted to the program delivery center 2 (Step S78). In the program delivery center 2, the right holder of the vehicle 5 is specified on the basis of various kinds of information described above, reprogramming guide is notified to the vehicle 5, and reprogramming guide is executed (Step S79).

Figure 10:
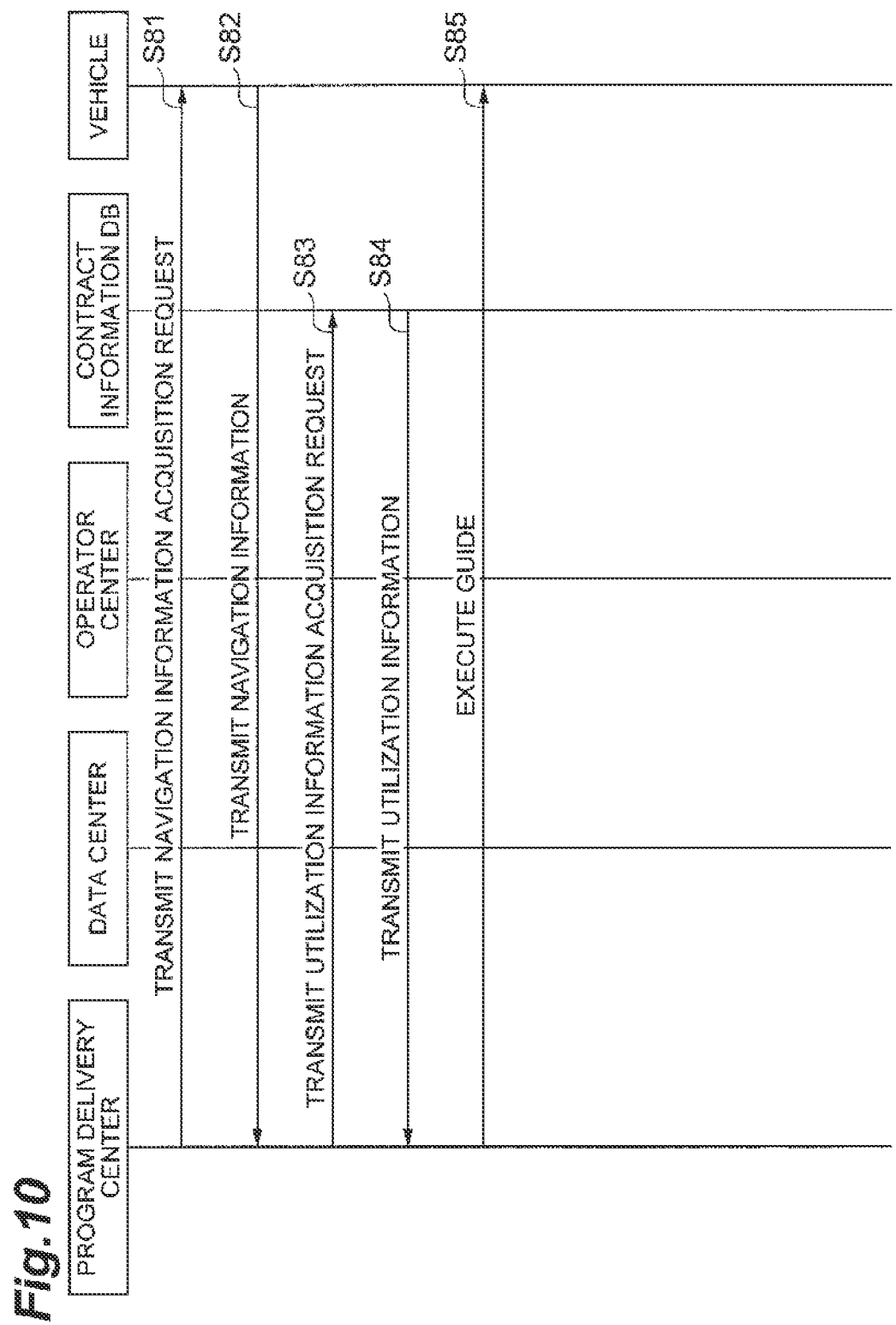
FIG. 10 is a sequence diagram showing right holder specification processing in a corporate vehicle.

Subsequently, the flow of data during right holder specification processing when the owner of the vehicle 5 is a corporate will be described. FIG. 10 is a sequence diagram showing right holder specification processing in a corporate vehicle.

As shown in FIG. 10, first, a navigation information acquisition request for requesting acquisition of navigation information from the program delivery center 2 is transmitted to the vehicle 5 (Step S81). In the vehicle 5 which receives the navigation information acquisition request transmitted from the program delivery center 2, the navigation information is acquired from the navigation system 53, and the navigation information is transmitted to the program delivery center 2 (Step S82). A utilization information acquisition request for requesting acquisition of utilization information from the program delivery center 2 is transmitted to the utilization information DB 7 (Step S83). In the utilization information DB 7 which receives the utilization information acquisition request transmitted from the program delivery center 2, the utilization information (information representing the status of utilization or reservation of a rental car or the like) is acquired, and the utilization information is transmitted to the program delivery center 2 (Step S84). In the program delivery center 2, the right holder of the vehicle 5 is specified on the basis of various kinds of information described above, reprogramming guide is notified to the vehicle 5, and reprogramming guide is executed (Step S85).

As described above, the program delivery center 2 is the program update device which updates the program of the ECU mounted in the vehicle 5, wherein the right holder specification unit 25 specifies the right holder who has a right to execute the update of the program on the basis of information regarding the vehicle 5, and the reprogramming guide execution unit 26 sets and outputs program update guide notification to the right holder. Accordingly, the update of the program by a person other than the right holder can be avoided, thereby improving security. Furthermore, since the update of the program is notified to the right holder who can execute the update of the program, the program update execution frequency increases compared to a case where the user who cannot the update of the program is notified, thereby prompting the execution of the program update. As described above, in the program delivery center 2, the update of the program can be prompted, and security can be improved.

The program delivery center 2 includes the right holder determination unit 24 which determines whether the vehicle 5 is owned by an individual or a corporate on the basis of the information regarding the vehicle, wherein the right holder specification unit 25 specifies the right holder in accordance with the determination result of the right holder determination unit 24. In this case, since whether the vehicle 5 is owned by an individual or owned (administrated) by a corporate is determined by the right holder determination unit 24, the right holder can be specified in conformity with the feature of the individual or the corporate.

When the right holder is a corporate, the reprogramming guide execution unit 26 sets and notifies program update guide to the administrator who administrates the vehicle 5. In this case, the update of the program can be prevented from being notified to a person who just belongs to the corporate or rents the vehicle from the corporate. As a result, the update of the program can be further prompted, and security can be further improved.

The right holder determination unit 24 and the right holder specification unit 25 specify the right holder of the vehicle 5 on the basis of information relating to the vehicle chassis, such as the vehicle chassis number information representing the vehicle chassis number of the vehicle 5, the maintenance record information relating to the maintenance records of the vehicle 5, the parking lot information relating to the contract content of the parking lot contracted by the user of the vehicle 5, the automobile insurance information relating to the content of the automobile insurance contracted by the user of the vehicle 5, and the navigation configuration information relating to the content set by the user in the navigation system mounted in the vehicle 5. For this reason, the right holder can be satisfactorily specified.

The invention is not limited to the foregoing embodiment. For example, although in the foregoing embodiment, a configuration in which the program delivery center 2, the data center 3, and the operator center 4 are provided separately is made, the program delivery center 2, the data center 3, and the operator center 4 may be the same center. The program update device may be mounted in the vehicle 5.

Although in the foregoing embodiment, the control device of the invention is applied to reprogramming of the ECU, the invention may be applied to rewriting of a program of an FPGA (Field Programmable Gate Array) as the control means. The FPGA is a gate array into which a logic circuit is writable, and is configured such that a program of the logic circuit is rewritable (change of a control content). In the FPGA, a program is read from a memory, thereby realizing the functions.

REFERENCE SIGNS LIST

2: program delivery center (control device), 24: right holder determination unit (determination means), 25: right holder specification unit (right holder specification means), 26: reprogramming guide execution unit (change guide setting means).

The invention claimed is:

1. A control device which changes a control content of an electronic device mounted in a vehicle, the control device comprising:
    a processor programmed to remotely control a program of the electronic device mounted in the vehicle by:
    acquiring information regarding the vehicle from at least one of the vehicle or an information database separate from the vehicle in which vehicle information is stored;
    determining ownership of the vehicle is either an individual or a legal entity based on the acquired information regarding the vehicle;
    specifying a right holder of the vehicle who has a right to execute change of a program of the electronic control device on the basis of a result of the determination of ownership of the vehicle and the acquired information regarding the vehicle; and
    setting and outputting a control content change guide notification to the right holder of the vehicle in accordance with the result of the determination of ownership of the vehicle, wherein the setting and outputting of the control content change guide notification to right holder is different when the result of determination of ownership of the vehicle is a legal entity as compared to when the result of determination of ownership of the vehicle is an individual.

2. The control device according to claim 1,
wherein, based upon the processor specifying the ownership is a legal entity, the right holder administrator, and the processor notifies the change of the control content to the administrator who administrates the vehicle, and
wherein, based upon the processor specifying the ownership is an individual, the processor obtains biometric information of a user acquired by at least one sensor before the processor notifies the change of the control content to the user.

3. The control device according to claim 1,
wherein information regarding the vehicle includes at least one of vehicle chassis number information representing the vehicle chassis number of the vehicle, maintenance record information relating to the maintenance records of the vehicle, parking lot information regarding a contract content of a parking lot contracted by a user of the vehicle, automobile insurance information regarding to the content of an automobile insurance contacted by the user of the vehicle, or navigation configuration information relating to a content set by the user in a navigation system mounted in the vehicle.

4. The control device according to claim 1,
wherein the right holder is the owner of the vehicle.

* * * * *